3,194,114
NEGATIVE MANIPULATING MEANS FOR PHOTO-
GRAPHIC COPYING APPARATUS
Walter L. Weinberg, 3 Laurel Drive,
New Hyde Park, N.Y.
Filed Dec. 26, 1962, Ser. No. 247,024
11 Claims. (Cl. 88—24)

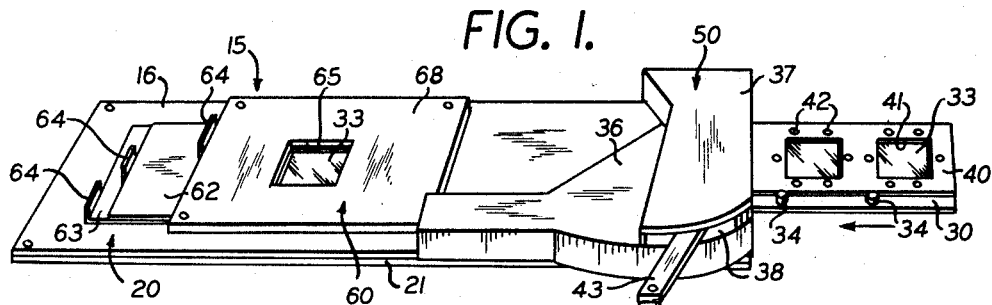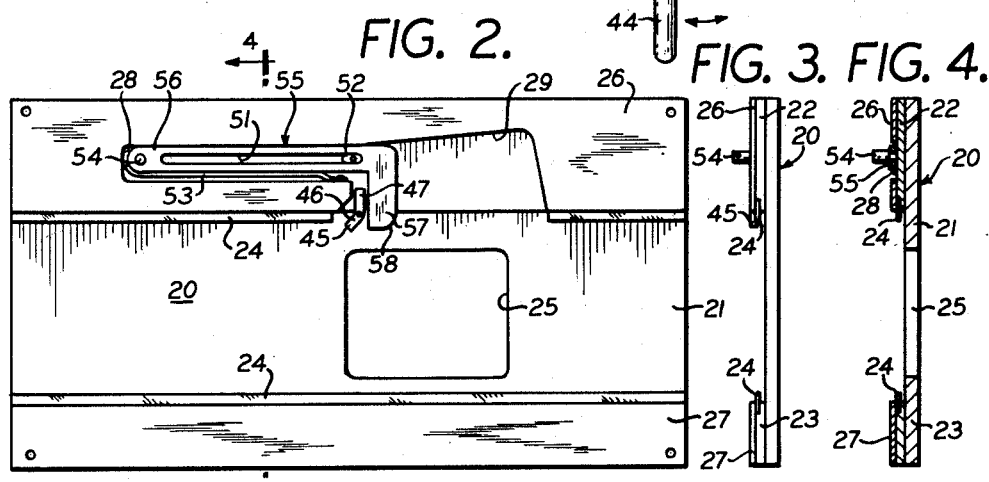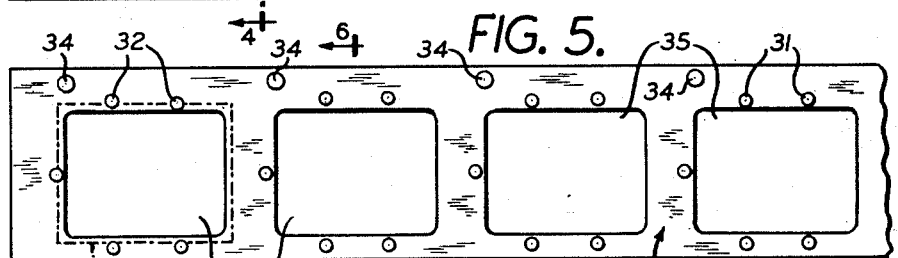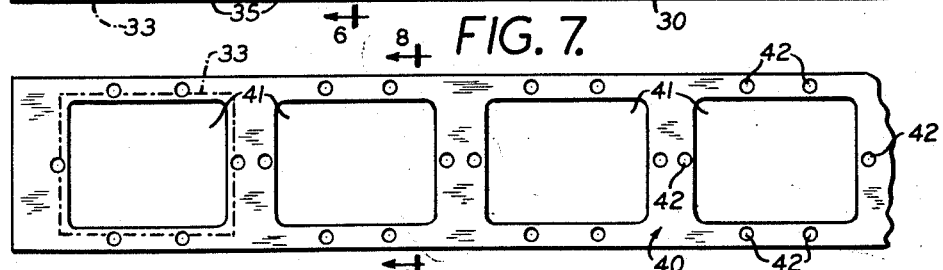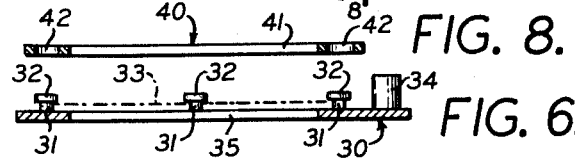
INVENTOR
WALTER L. WEINBERG

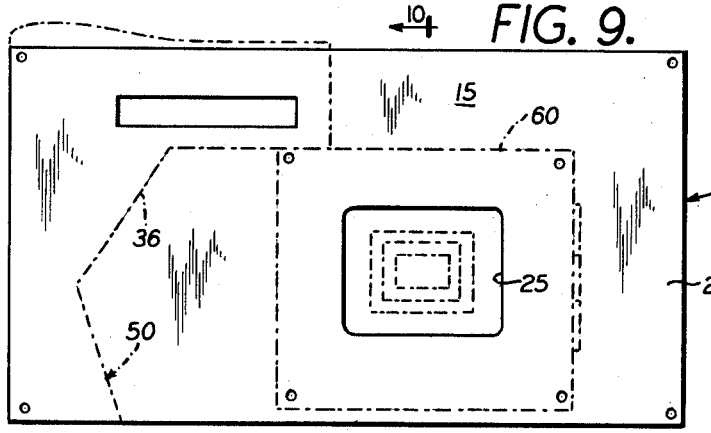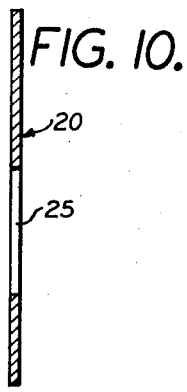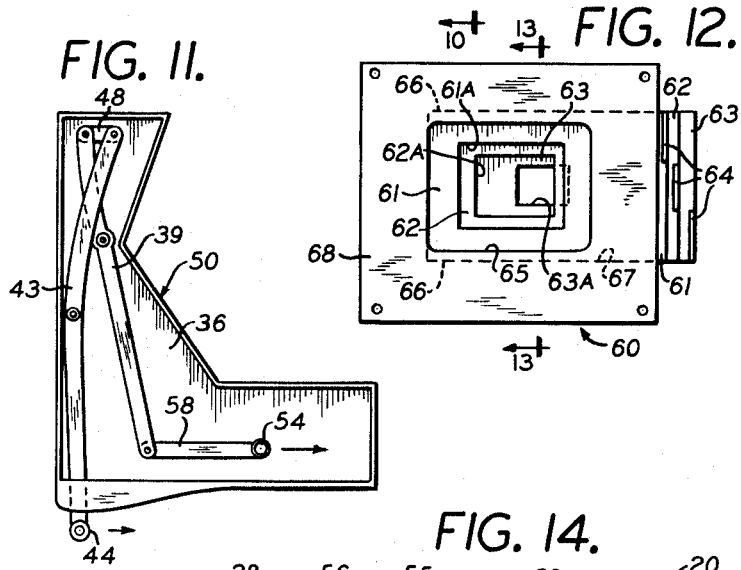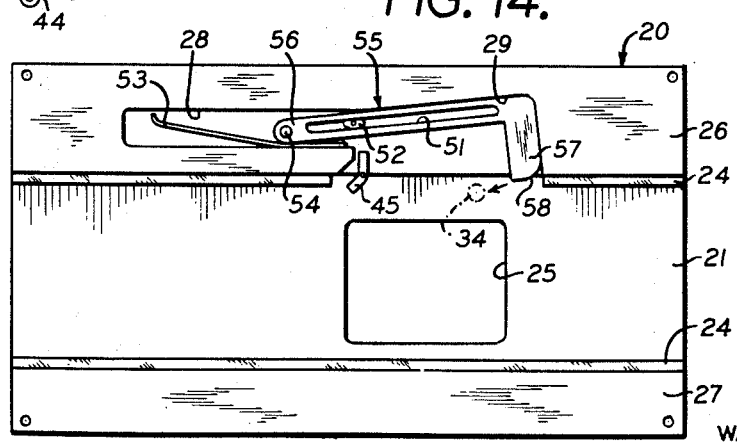

This invention relates to photographic copying apparatus and, more particularly, to a novel negative manipulating means for such apparatus whereby a plurality of negatives may be copied in a minor fraction of the time normally required, and the output of the apparatus, per man hour, very substantially increased.

In the usual manner of utilizing photographic copying apparatus, such as enlargers, printers, and the like, a negative, generally known as a "master" negative, is placed in a suitable frame or holder and after the negative is properly positioned in the frame or holder, the latter is positioned in the photographic apparatus and properly aligned with the optical axis or center of the light rays thereof. The negative is thereupon copied, after which the frame is removed from the machine, disassembled to remove the negative therefrom, and a second negative is placed in the frame and similarly processed.

This individual handling of each separate negative for copying, enlarging, or printing thereof results in a relatively small output of the apparatus per man hour. This, in turn, has increased the expense of copying or enlarging negatives and has required a substantial investment in copying apparatus in order to meet heavy production schedules.

In accordance with the present invention, the time and labor required to copy a plurality of negatives, and the capital investment in the photographic apparatus, are both very substantially reduced. More particularly, the present invention provides a multiply negative manipulating means which is arranged for mounting upon photographic copying apparatus.

In using the present apparatus, the manipulating means is removed from the photographic copying apparatus and is readily and easily loaded with a plurality of negatives to be copied. The manipulating means is then positioned on the apparatus and, by a relatively simple operation of manual operating means, a plurality of negatives mounted in the manipulating apparatus are successively copied, enlarged, printed or the like. The manipulating means is then removed from the machine and the negatives unloaded therefrom, after which a further series of negatives may be loaded into the manipulating means. If a pair of manipulating means are provided, one may be loaded at the time another is being processed through the photographic copying apparatus.

To this end, the present invention comprises a slide guide including a substantially flat base constructed and arranged for mounting upon photographic copying apparatus, the base having an aperture therethrough for centering on the optical axis of the copying apparatus. A relatively elongated and preferably substantially flat slide is mounted on the slide guide for movement longitudinally of the base across the optical axis of the copying apparatus, and this slide is formed with plural substantially identical apertures therethrough spaced uniformly longitudinally thereof. Each aperture in the slide is alignable in substantially congruent registry with the slide guide aperture by relative longitudinal movement of the slide. Negative positioning means are disposed around the periphery of each slide aperture, and positioning abutment means are provided along the slide at longitudinal spacing equal to the center-to-center spacing of the slide apertures. Releasable stop means are provided on the slide guide and are engageable with a positioning abutment means on the slide each time a slide aperture is congruently registered with the slide guide aperture, and reciprocable operating means are provided on the slide guide for successive engagement with the positioning abutment means to advance the slide longitudinally of the guide to position successive slide apertures in such congruent registry with the slide guide aperture.

For an understanding of the principles of the invention, reference is made to the following description of a typical embodiment thereof as illustrated in the accompanying drawings. In the drawings:

FIG. 1 is a perspective view of master negative manipulating means embodying the invention;

FIG. 2 is a plan view of the slide guide;

FIG. 3 is a right end elevational view of the slide guide;

FIG. 4 is a sectional view taken on the line 4—4 of FIG. 2;

FIG. 5 is a plan view of the slide;

FIG. 6 is a sectional view taken on the line 6—6 of FIG. 5;

FIG. 7 is a plan view of a cover and holding plate cooperable with the slide of FIG. 5 to retain the negatives flat against the slide;

FIG. 8 is a sectional view taken on the line 8—8 of FIG. 7;

FIG. 9 is a bottom plan view of the slide guide;

FIG. 10 is a sectional view on the line 10—10 of FIG. 9;

FIG. 11 is a bottom plan view of the reciprocable operating means removed from the slide guide;

FIG. 12 is a plan view of a selective masking assembly used with the manipulating means;

FIG. 13 is a sectional view on the line 13—13 of FIG. 12; and

FIG. 14 is a view, similar to FIG. 2, illustrating another position of the reciprocable operating means.

Referring to FIG. 1, the manipulating means 15 of the invention includes a slide guide 20 on which is mounted a relatively elongated slide 30 movable longitudinally of slide guide 20. Slide 30 is preferably associated with a cover plate 40 for maintaining negatives in flat position thereon. A reciprocable operating means for slide 30 is generally indicated at 50, and a mask assembly may be provided as indicated at 60.

Slide guide 20 includes a relatively flat base 21 constructed and arranged for mounting upon photographic copying apparatus and formed with a substantially rectangular aperture 25 which, when slide guide 20 is mounted upon the photographic apparatus, is centered on the optical axis of such apparatus. Slide guide 20 may be made of any suitable material, such as metal or suitable rigid plastic, and, while illustrated as a composite assembly, may be machined or otherwise formed from a single piece of the material.

The base plate 21 is substantially rectangular and, extending along one side thereof, is a strip 22 flush with the longitudinal edge of the base plate, while a strip 23 extends along the other side thereof and is flush with the other edge of the base plate. Strip 22 is somewhat wider than strip 23, for a purpose to be described, and aperture 25 is substantially centered laterally between the inner edges of the strips 22 and 23. The inner upper edge of each strip 22 or 23 is recessed to receive a strip of anti-friction material 24, such as a strip of self-lubricating plastic, particularly nylon. A strip 26 overlies the strip 22, and a strip 27 overlies the strip 23. The strip 23 is substantially rectangular, whereas the strip 26 is formed with a cutout or slot formation therein. The base 21 and the strips 22, 23, 26 and 27 may be secured together in any suitable manner, as by riveting, with strips 22 and 23 clamping nylon strips 24 in position in the recesses in strips 22 and 23.

As stated, strip 26 is formed with a cutout or slot for a purpose to be described, and this cutout is illustrated as opening through the inner edge of strip 26 adjacent aperture 25. The cutout includes a substantially rectangular slot 28 extending forwardly from the aperture 25 and a substantially trapezoidal slot 29 which is laterally adjacent aperture 25. The communicating slots 28 and 29 are best shown in FIGS. 2, 4 and 14.

The slide guide preferably includes a substantially flat cover plate 60 secured on top of strips 26 and 27, and formed with an aperture congruently registrable with aperture 25, as well as with suitable locating means, such as pins or apertures, by means of which it may be readily and easily oriented in the photographic copying apparatus.

Slide 30 is arranged to be longitudinally slidable in the guide channel formed on base 20 by the described construction. Slide 30 is a substantially flat and rectangular piece of material, preferably metal, which has a width substantially equal to the lateral spacing of the inner edges of strips 22 and 23, and a thickness such that the slide will fit easily beneath self-lubricating guide strips 24. Slide 30 may have any length desired depending upon the number of negatives it is desired to process in any one operation. As best seen in FIGS. 5 and 6, slide 30 is formed with a series of substantially rectangular apertures 35 each substantially congruent with the aperture 25 of slide guide 20. Apertures 35 are spaced uniformly of the slide 30 and are positioned laterally thereof such that their longitudinal edges will register with the longitudinal edges of aperture 25 as slide 30 is moved longitudinally of slide guide 20. Along three edges of each aperture 35, headed pins 31 having enlarged heads 32 are positioned, the fourth side of each aperture being left without the pins 31. Heads 32 of pins 31 are spaced above the upper surface of slide 30 by a distance at least equal to the thickness of the negatives to be processed. By virtue of leaving one side of each aperture without any pins therealong, a negative 33, as indicated in dotted lines in FIGS. 5, 6 and 7, may be readily and easily positioned in centered relation with an aperture 35 by engagement beneath heads 32 of pins 31 and in engagement with the pins 31 arranged along the three sides of each aperture.

It will be noted that apertures 35 are nearer one longitudinal edge of slide 30 than they are to the other longitudinal edge thereof, in the same manner as aperture 25 is nearer strips 23 and 27 than it is to strips 22 and 26. This leaves a wider space along one edge of slide 30 and, positioned at uniformly spaced intervals longitudinally of this wider space, are positioning abutment means, such as pins or posts 34. The longitudinal spacing of pins or posts 34 is equal to the center-to-center spacing of apertures 35. From FIG. 6, it will be noted that posts 34 have a substantially larger diameter than that of pins 31 and are likewise longer than the pins 31. Posts 34 cooperate with the reciprocable operating means generally indicated at 50, and their longitudinal positional relation with respect to each aperture 35 is such that, when a post 34 engages a releasable stop 45 on the slide guide 20, the associated respective aperture 35 will be congruently registerable with slide guide aperture 25.

A substantially flat cover plate 40 is provided to hold negatives 33 flat against slide 30. Cover plate 40 is formed from a flat piece of material, and with relatively large rectangular apertures 41 which are congruently registrable with apertures 35 of slide 30. Around all four sides of each aperture 41 there are formed relatively small apertures 42 each having a diameter such as to fit over a head 32 of a pin 31 of slide 30. By providing apertures 42 around all four sides of exposure apertures 41, cover plate 40 may be placed on the slide 30 without respect to which end of the cover plate is adjacent to which end of the slide. It will be noted that, in the case of cover plate 40, apertures 41 are substantially centered transversely of the cover plate. Additionally, these apertures 41 have a center-to-center spacing equal to the center-to-center spacing of the apertures 35 in the silde 30. The width of cover plate 40 is such that, when positioned with its apertures 42 fitting over heads 32 of pins 31, the cover plate will clear positioning pins or posts 34 of slide 30. In additon, the other edge of cover plate 40 is spaced inwardly of the corresponding edge of slide 30 an amount sufficient to clear the nearer nylon guide strip 24 of the slide guide 20.

Releasable stop 45 is a bent crank element which is pivoted, as at 46, to slide guide 20 adjacent the forward edge of trapezoidal slot 29 in strip 26. Crank or stop 45 has a relatively short arm 46 projecting into the path of movement of positioning posts 34 of slide 30, and a relatively longer arm 47 extending into slot 29. Angular movement of crank 45 in a clockwise direction is limited by engagement of shorter arm 46 with either a pin or an edge portion of strip 26. In a manner to be described, as arm 46 is engaged by a positioning post 34 on slide 30, stop 45 is locked against clockwise rotation so that it prevents further movement of slide 30 to the left, as viewed in FIG. 2.

The operating mechanism 50 for advancing slide 30 longitudinally of slide guide 20, in a step-like manner, is best shown in FIGS. 1, 2, 4, 11 and 14. Referring particularly to FIGS. 2, 4 and 14, this mechanism includes a reciprocable hook 55 which has a relatively long arm 56 and a relatively short arm 57. These two arms extend substantially perpendicular to each other, with the outer rear corner of shorter arm 57 being bevelled or curved, as at 58, for a purpose to be described. Longer arm 56 is arranged for guiding along rectangular slot 28 of strip 26 by means of a longitudinal slot 51 engaging an oval guide 52 which is pivoted to the strip 22.

A leaf spring 53 is secured to strip 26 to extend along the inner edge of slot 28, and this leaf spring 53 is continuously engaged with arm 56 of hook or crank 55. It thus constrains arm 56 of hook 55 to engage the outer edge of slot 28 so that, during recirpocation of hook 55, the latter will tend to move substantially parallel to the edges of strip 26. However, when slide 30 is positioned in slide guide 20 and hook 55 is moved to the right, the curved edge 58 engaging one of the positioning pins 34 on slide 30 will cause hook 55 to be swung counterclockwise, after the major portion of the length of arm 56 is outside slot 28, so that curved edge 58 may ride over the pin 34 and arm 57 may engage behind the pin. Such engagement behind the pin is effected by the spring 53 in biasing engagement with that portion of the arm 56 which is still within the slot 28.

It will further be noted that the short arm 57 normally projects into the path of movement of pins 34 on the slide 30. When arm 57 is engaged behind a pin 34, and hook 55 is moved to the left, by means described more fully hereinafter, and as the respective pin 34 approaches stop 45, arm 57 will engage arm 47 of this stop to prevent clockwise movement of stop 45 and thereby arrest motion of pin 34 in a position wherein an aperture 35 of slide 30 is in congruent registry with aperture 25 of slide guide 20. Upon reciprocation of hook 55 to engage behind the next adjacent pin 34, and to move this pin to the left as viewed in FIG. 2, crank stop 45 is released for swinging in a clockwise direction to let the advance pin 34 pass to the left thereof.

The position of operator 55 when moved to the right is illustrated in FIG. 14, wherein it will be noted that, as the curved edge 58 of its short arm 57 rides over a pin 34 on slide 30, the outer edge of arm 56 of hook 55 will abut against the longer edge of trapezoidal slot 29 in strip 26. A pin 54 is mounted on the outer end of arm 56 and extends upwardly from this arm.

The operating means 50 further comprises a generally boot shaped hollow housing 36 arranged to overlie one end of slide guide 20 and to enclose hook 55 and its guide slots 28 and part of 29. As best seen in FIG. 1, housing 36 has a raised portion 37 adjacent the end of slide guide 20, and the wall of the housing is formed with a slot 38. Referring to FIG. 11, a relatively long and somewhat curved lever 43 is pivoted intermediate its ends on a pivot in housing 36, and has an outer end projecting through slot 38 where it is provided with an operating handle 44. A second and somewhat shorter lever 39 is mounted entirely within housing 36, also being pivoted intermediate its ends. The shorter ends of levers 39 and 43 are pivotally interconnected by a relatively short link 48, and a longer link 58 connects the outer end of lever 39 to pin 54 on hook 55.

With the described arrangement, when handle 44 is moved to the right, as viewed in FIG. 11, link 58 will be moved to the right. By reference to FIG. 14, it will be noted that this, in turn, will move hook 55 to the right to catch beyond a positioning abutment 34 of slide 30. When handle 44 is moved to the left, as viewed in FIG. 11, or to the right, as viewed in FIG. 1, hook 55 will be drawn back to move the next aperture 35 of slide 30 into congruent registry with aperture 25 of slide guide 20. Thus, a relatively simple operating means is provided for stepping slide 30 through slide guide 20.

The mask assembly 60 is provided for the purpose of reducing the area of exposure apertures 25 and 35, as where a smaller negative is used, or where it is desired to "spot" a special area of a negative. Referring to FIGS. 1, 12 and 13, the masking device comprises a substantially rectangular plate 61 of metal or the like formed with a rectangular aperture 65 therethrough which is congruent with apertures 25 and 35. The longitudinal edges of aperture 65 are formed with substantially rectangular grooves 66 which are continued through one end of plate 60 as a slot 67.

In the particular embodiment of the invention illustrated in the drawings, slot 67 and groove 66 slidably receive masks 61, 62 and 63 which are formed of relatively thin sheet material, such as sheet metal, each mask having a tab 64 bent up from its outer edge to serve as an operating means and also as an abutment. Mask 61 is formed with a preferably rectangular opening 61A which is somewhat smaller than the aperture 65. Mask 62 is formed with a preferably rectangular opening 62A which is smaller than the opening 61A, and mask 63 is formed with a relatively small rectangular opening 63A. Mask 61 is moved into position first and, if the resultant aperture is too large, then mask 62 is moved into position. If the aperture is still too large, mask 63 is moved into position thus reducing the effective aperture to its smallest size. Plate 68 is bolted, riveted, or screwed to the remainder of slide guide 20.

In the operation of the device, after a loaded slide 30 has been moved completely through slide guide 20, this slide and its cover 40 are removed from guide 20, cover 40 is removed, the negatives 33 are removed from the slide, and a new series of negatives 33 are placed in position on the slide. Cover plate 40 is then replaced and the slide is again inserted partly into slide guide 20. By operation of handle 44, the leading aperture 35 may be brought into registry with aperture 25 in slide guide 20, and the requisite processing be effected. By subsequent actuation of handle 44, the remaining slides are successively brought into registry with the aperture 25.

While a specific embodiment of the invention has been shown and described in detail to illustrate the application of the principles of the invention, it will be understood that the invention may be embodied otherwise without departing from such principles.

What is claimed is:

1. For use in photographic copying apparatus: negative manipulating means comprising, in combination, a slide guide including a substantially flat base constructed and arranged for mounting upon photographic copying apparatus, said base having an aperture therethrough for centering on the optical axis of the apparatus; a relatively elongated and substantially flat slide disengageably mounted in said slide guide for movement longitudinally of such base across such optical axis, said slide being formed with plural substantially identical apertures therethrough spaced uniformly longitudinally thereof; each slide aperture being alignable in substantially congruent registering relation with said slide guide aperture by relative longitudinal movement of said slide; negative positioning means around the periphery of each slide aperture; positioning abutment means along said slide at longitudinal spacings equal to the center-to-center spacings of said slide apertures; releasable stop means on said slide guide engageable with a positioning abutment means each time a slide aperture is congruently registered with the slide guide aperture; and reciprocable operating means on said slide guide engageable successively with said positioning abutment means to advance said slide longitudinally of said slide guide to position successive slide apertures in such congruent registry with said slide guide aperture.

2. Negative manipulating means for use in photographic copying apparatus, as claimed in claim 1, including a substantially flat cover positionable on said slide and overlapping negatives positioned in registry with the slide apertures; said cover being formed with apertures equal in number to the slide apertures and congruently registrable therewith; and interengageable positioning and locating means on said slide and on said cover.

3. Negative manipulating means for use in photographic copying apparatus, as claimed in claim 2, in which said slide guide aperture and said slide apertures are substantially rectangular; said negative positioning means comprising a plurality of headed pins positioned around three sides of each slide aperture, the distance of the pin heads from the upper surface of the slide being at least equal to the thickness of the negatives; said positioning and locating means comprising the heads of said pins and correspondingly located apertures in said cover conformingly engageable with said pin heads.

4. Negative manipulating means for use in photographic copying apparatus, as claimed in claim 1, in which said reciprocable operating means includes a hook mounted for reciprocation longitudinally of said slide guide; said hook including a hook end projectable into the path of movement of said positioning abutment means; means biasing said hook to a position in which said hook end projects into such path of movement; said hook being oscillatable, upon engagement with a positioning means upon movement of said hook in one direction longitudinally of said slide guide, to retract said hook end from such path of movement; said biasing means, after said hook end has passed a positioning abutment means, oscillating said hook to a position in which said hook end is engaged in back of the positioning abutment means.

5. Negative manipulating means for use in photographic copying apparatus, as claimed in claim 4, in which said positioning abutment means comprises posts extending from the upper surface of said slide and arranged in longitudinal alignment along said slide; said releasable stop means comprising an oscillatable stop having an arm projecting into the path of movement of said positioning abutment means; said hook end, upon engagement of a positioning abutment means with said arm of said releasable stop means, engaging said releasable stop means and restraining the latter from movement to a position providing for passage of a positioning abutment means therebeyond.

6. Negative manipulating means for use in photographic copying apparatus, as claimed in claim 4, in which said hook comprises a relatively elongated second arm extending generally parallel to the length of such slide guide means and formed with a longitudinal slot; said second arm being engaged in a rectangular guiding formation extending longitudinally of said slide guide, and said hook being movable to a position in which only a minor portion of the length of said second arm is disposed in said guiding formation; said hook in said extended position having its hook end disposed in a second guide formation providing for oscillation of said hook to retract the hook end from the path of movement of said positioning abutment means; a pin on said slide guide engaged in said slot and providing for such oscillation of said hook; and a leaf spring engaged between said first guiding formation and said second arm and biasing said hook to a position in which said second arm extends substantially parallel to the direction of movement of said slide through said slide guide.

7. Negative manipulating means for use in photographic copying apparatus, as claimed in claim 6, including manual operating means connected to the end of said second hook arm opposite the end joined to said hook end, and operable to reciprocate said hook longitudinally of the path of movement of said slide while providing for such oscillation of said hook.

8. Negative manipulating means for use in photographic copying apparatus, as claimed in claim 1, in which said slide guide includes means on said base plate providing a longitudinally extending guide channel for said slide; said slide comprising a substantially flat plate engageable in said guide channel.

9. Negative manipulating means for use in photographic copying apparatus, as claimed in claim 8, including self-lubricating bearing means extending along opposite longitudinal edges of said guide channel and engageable with said slide.

10. Negative manipulating means for use in photographic copying apparatus, as claimed in claim 8, said slide guide including a substantially flat cover plate engaged with said guide channel and in spaced relation to said base; said cover plate having an aperture congruently registering with the aperture in said base.

11. Negative manipulating means for use in photographic copying apparatus, as claimed in claim 10, including a masking assembly mounted on said cover plate; said masking assembly including a plate having an aperture therethrough congruently registering with the apertures in said cover plate and in said base; a pair of parallel sides of said aperture being formed with guiding grooves communicating with a slot extending through one edge of said mask assembly plate; and a plurality of masks arranged in superposed relation in said slot and movable into said grooves; said masks having apertures of various sizes whereby, upon selective positioning of a mask in said grooves, the effective aperture of said manipulating means may be changed in size.

References Cited by the Examiner
UNITED STATES PATENTS

| | | | |
|---|---|---|---|
| 2,168,987 | 8/39 | Hopkins et al. | 88—18.4 |
| 2,431,662 | 11/47 | Ralph | 88—26 X |
| 2,914,985 | 12/59 | Badalich | 88—26 X |
| 2,985,068 | 5/61 | Ness | 88—24 |

NORTON ANSHER, *Primary Examiner.*